United States Patent [19]

Ostrom et al.

[11] 4,413,783
[45] Nov. 8, 1983

[54] COUPLER FOR AN IRRIGATION SYSTEM

[75] Inventors: Carl R. Ostrom, Omaha; Dennis R. Theilen, Fremont, both of Nebr.

[73] Assignee: Valmont Industries, Inc., Valley, Nebr.

[21] Appl. No.: 279,771

[22] Filed: Jul. 2, 1981

Related U.S. Application Data

[63] Continuation-in-part of Ser. No. 161,678, Jun. 23, 1980.

[51] Int. Cl.³ .............................................. B05B 3/00
[52] U.S. Cl. .................................................. 239/183
[58] Field of Search ....................... 239/183, 184, 191; 137/344; 251/149.1, 149.6

[56] References Cited

U.S. PATENT DOCUMENTS

| | | | |
|---|---|---|---|
| 3,575,200 | 4/1971 | Imeson | 239/183 |
| 3,590,869 | 7/1971 | Linsowe | 137/614.03 |
| 3,920,102 | 9/1976 | Harvey | 239/186 X |
| 4,036,436 | 7/1977 | Standal | 239/186 |
| 4,159,080 | 6/1979 | Standal | 239/183 |
| 4,172,556 | 10/1979 | Standal | 239/183 X |
| 4,192,335 | 3/1980 | Standal | 137/1 |
| 4,274,584 | 6/1981 | Noble | 239/1 |
| 4,295,607 | 10/1981 | Noble | 239/183 |

*Primary Examiner*—John J. Love
*Assistant Examiner*—Gene A. Church
*Attorney, Agent, or Firm*—Rogers, Eilers & Howell

[57] ABSTRACT

A coupler for an irrigation system for delivering liquid to the irrigation system from a pressurized pipe line extending along the field to be irrigated. The coupler connects and disconnects to risers or connectors spaced along the pipe line for operating valves associated with the risers for delivering liquid from first one riser and then another for irrigating the field.

34 Claims, 11 Drawing Figures

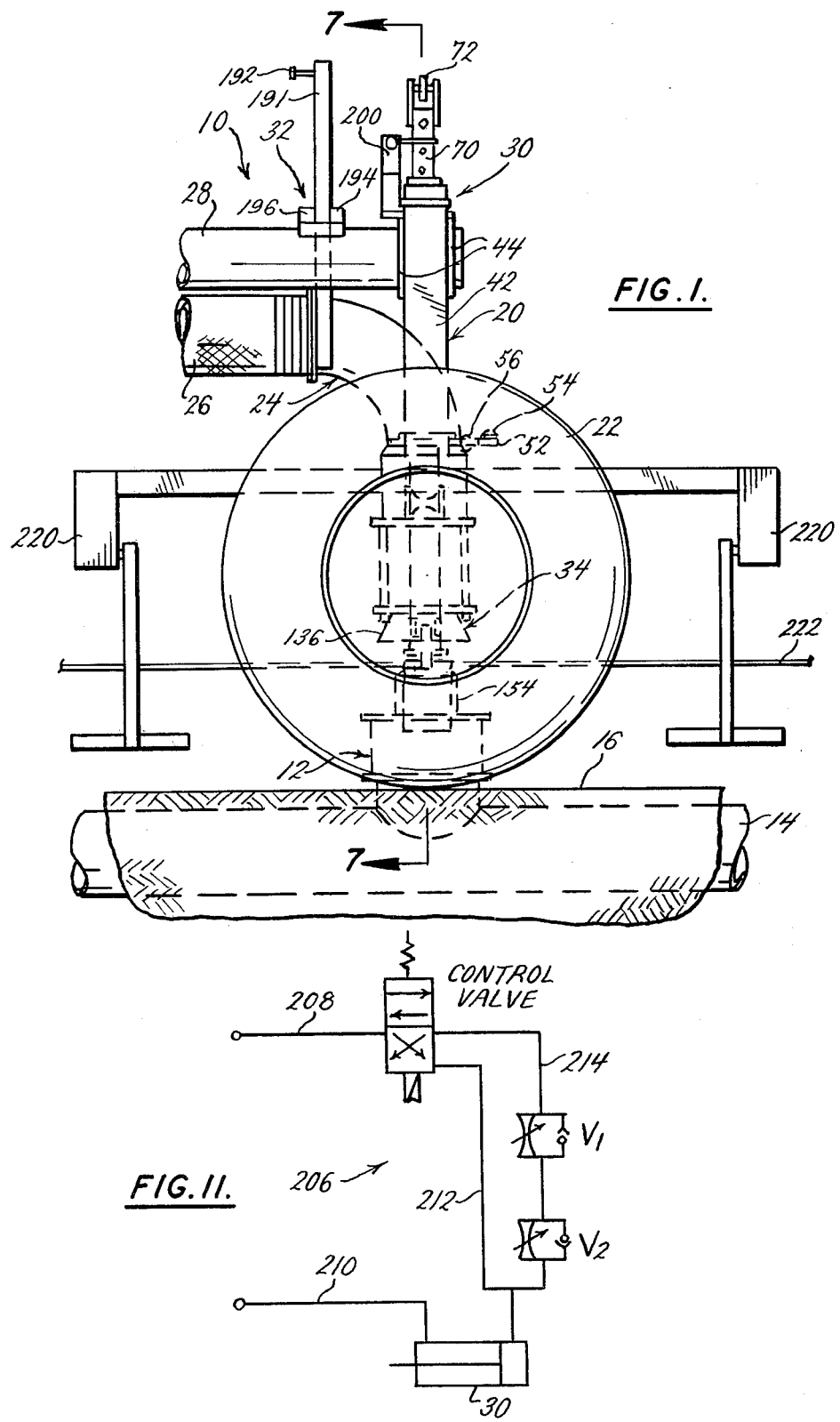

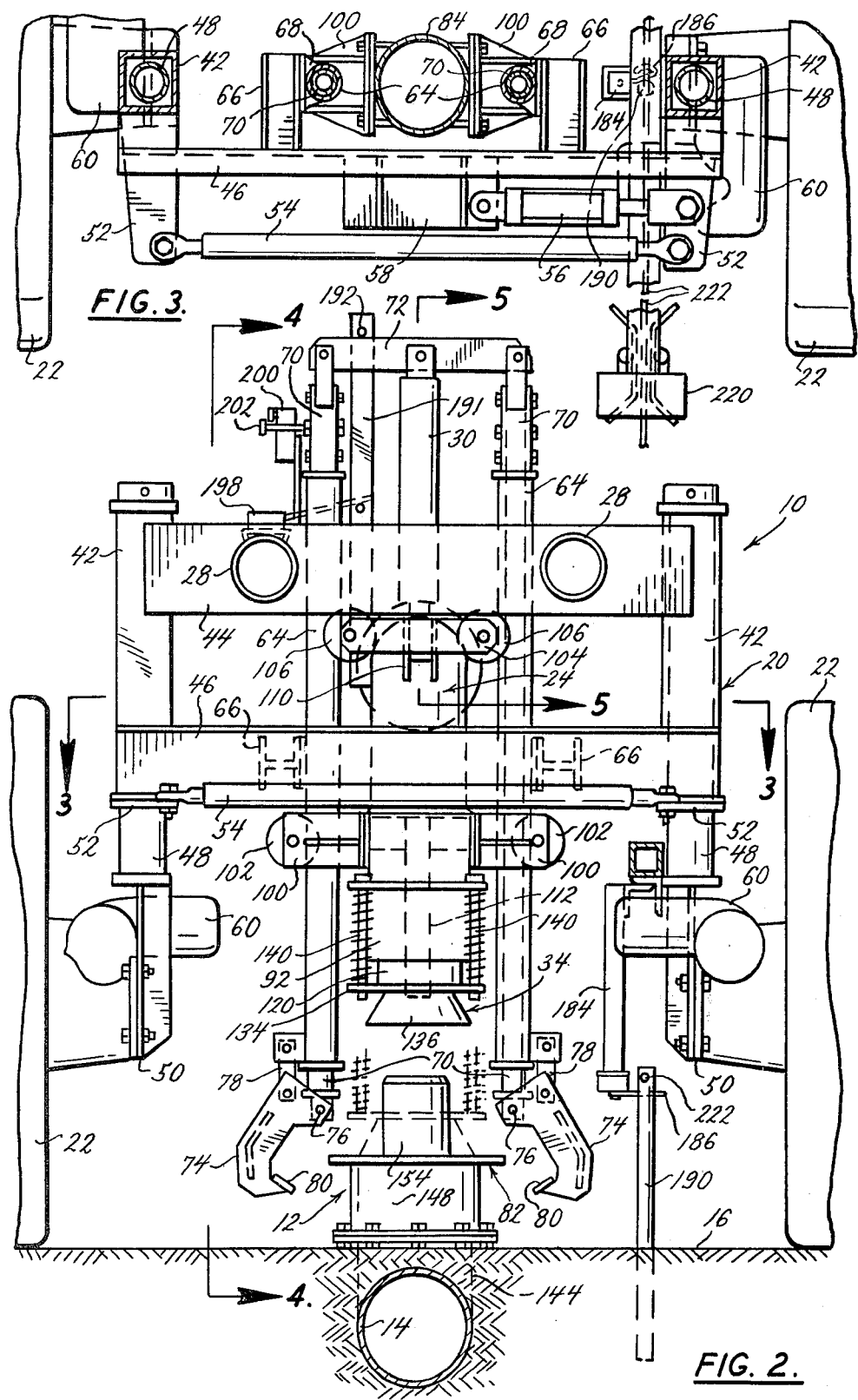

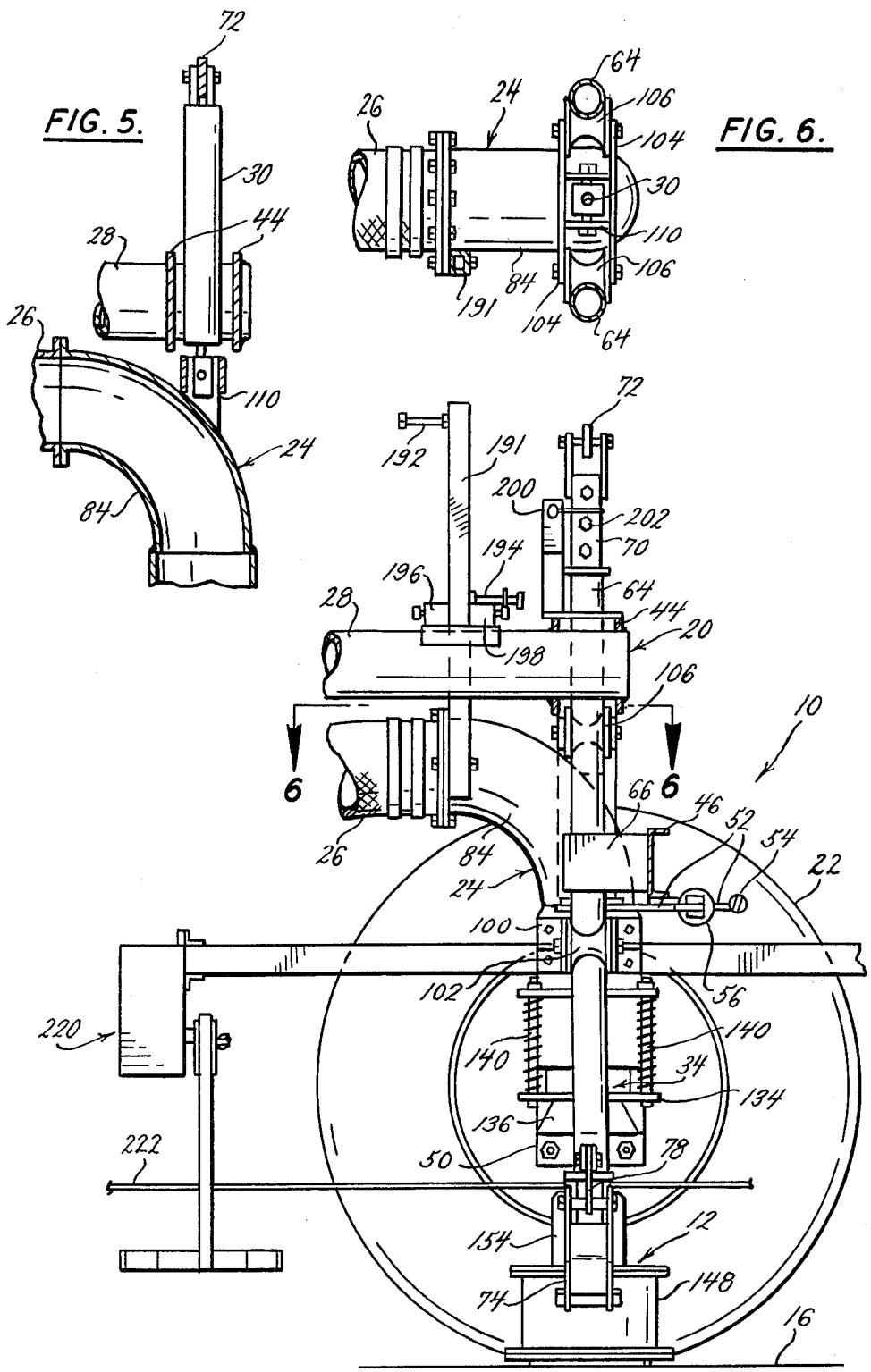

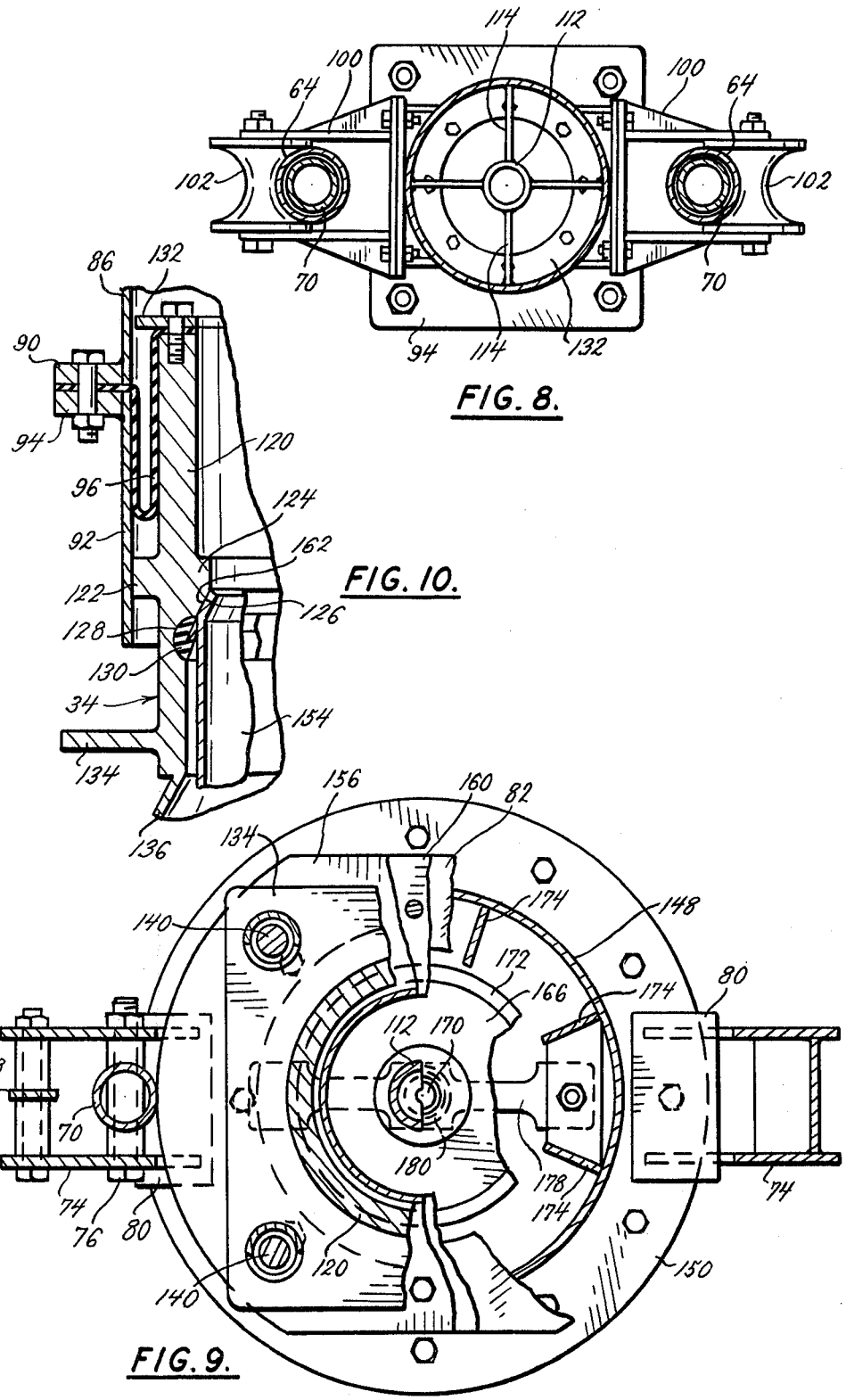

COUPLER FOR AN IRRIGATION SYSTEM

This application is a continuation-in-part of Ser. No. 161,678, filed June 23, 1980.

BACKGROUND AND SUMMARY OF THE INVENTION

This invention is directed to a coupler for an irrigation system for progressive connection and disconnection with a series of risers or connectors along a pressurized pipe line for delivering liquid, under pressure, from the pipe line to the irrigation system. The coupler of the present invention is particularly useful with an irrigation system of the linear type where both ends of the system move over the field to be irrigated. Such a system is distinguished from those of the center-pivot type where one end of the system is pivotally mounted at a central location in the field for rotation of the system about a generally vertical axis at the pivot location.

More specifically, the present invention is particularly useful on linear systems having a liquid delivery apparatus for continuously delivering liquid from the pressurized pipe line to the irrigation system as the system moves over the field. Such systems are exemplified by those shown and described in U.S. Pat. Nos. 4,036,436 and 4,172,556, the entirety of which are incorporated herein by reference. A further example of such a system is that shown and described in U.S. patent application Ser. No. 06/161,678, filed June 23, 1980, of which this application is a continuation-in-part.

The primary object of the present invention is to provide such a coupler that is reliable and durable, that will operate repeatedly and for a long duration under conditions where sand and dirt are prevalent, and that will operate effectively and efficiently to open and close the valves within the risers under the liquid pressure with minimum spill and in a controlled manner to reduce the sudden impact of the liquid as would produce a water hammer upon operation of the valves.

Generally, the coupler of the present invention includes a conduit member operable relative a frame between a retracted disconnect position and an extended connect position. A sealing member is reciprocally mounted to the conduit member for engagement and disengagement with a riser. A valve operating means operates, in response to movement of the conduit member, to open and close the riser valve, such that partial extension of the conduit member engages the sealing member with the riser and further extension of the conduit member produces relative movement of the conduit and sealing members with said valve operating means opening said valve.

In a preferred embodiment of the invention, there are no sliding seals required to maintain a liquid seal between the riser and the coupler and between the relative moving members of the coupler so that sand and dirt have a minimal adverse effect on the coupler. The result is a coupler that is exceptionally dependable and reliable through long operation.

The invention will now be described in more detail with reference to the drawings, but first the drawings themselves will be described briefly.

DESCRIPTION OF THE DRAWINGS

FIG. 1 is a side elevation view of a coupler of the present invention; FIG. 2 is an enlarged view in section taken generally along the line 2—2 of FIG. 1;

FIG. 3 is a view in section taken generally along the line 3—3 of FIG. 2;

FIG. 4 is a view in section taken generally along the line 4—4 of FIG. 2;

FIG. 5 is a view in section taken generally along the line 5—5 of FIG. 2;

FIG. 6 is a view in section taken generally along the line 6—6 of FIG. 4;

FIG. 8 is a view in section taken generally along the line 8—8 of FIG. 7;

FIG. 9 is an enlarged view in section taken generally along the line 9—9 of FIG. 7;

FIG. 10 is an enlargement of a portion of FIG. 7 showing the seal connections between coupling members and between the coupling and the riser; and, FIG. 11 is a schematic of a hydraulic circuit for the coupler of this invention.

DESCRIPTION OF A PREFERRED EMBODIMENT

Figure 7:
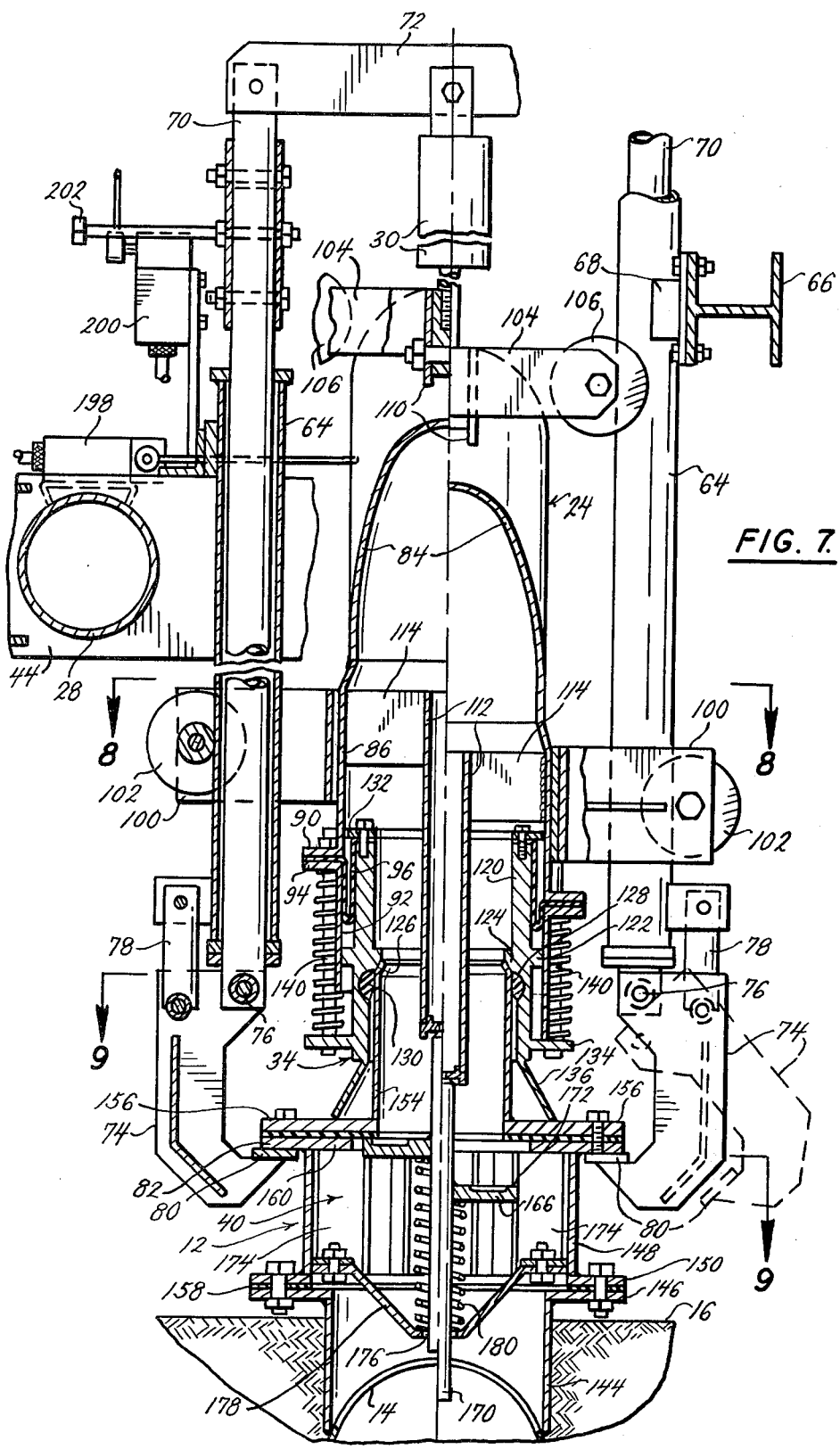
FIG. 7 is an enlarged view in section taken generally along the line 7—7 of FIG. 1, FIG. 7 being split to show the coupler in two different positions.

With reference to the drawing there is shown a coupler 10 of the present invention for connection to a riser 12 of a pipe line 14. The pipe line 14 may be buried beneath the ground 16 and extend along the field to be irrigated. While only one riser is shown, it is to be understood that the pipe line 14 has a series of risers spaced along its length to which the coupler progressively connects and disconnects for delivering liguid from the pipe line to an irrigation system of which the coupler is a part. The purpose of the pipe line 14 is to receive liquid, such as water, under pressure from a suitable source. Typically, water is pumped to the pipe line from a well. The pipe line may be typically eight to sixteen inches in diameter.

Generally, the coupler has a frame 20 supported for movement along the pipe line by wheels 22 that ride on the ground above the pipe line. The coupler also includes a conduit member 24 which is mounted for vertical reciprocating movement relative the frame between a retracted raised position with the coupler disconnected from the riser, and an extended lowered position with the coupler connected to the riser. One end of the conduit member 24 is adapted for connection to a boom member 26 which may be a flexible hose. A check valve (not shown) may be connected between the member 24 and hose 26. The frame 20 also is adapted for connection of another boom member 28 which may be a rigid pipe, the boom member 26 delivering liquid from the coupler to the irrigation system for irrigating the field.

The coupler also generally includes a piston/cylinder 30 connected for operating the conduit member between extended and retracted positions, and a switch assembly 32 which is part of an electrical control circuit for controlling the operation of the cylinder in a manner to be more fully described.

Further, by way of general description, at the lower end of the conduit member is a sealing member 34 for sealing engagement with the riser. The sealing member is mounted for vertical meovement relative the conduit member between retracted and extended positions upon connection and disconnection of the coupler from the riser, as will be more fully described. Within the conduit member 24 is a valve operating means 38 for operating a valve assembly 40 within the riser upon extending and retracting the conduit member. The coupler will now be described in more detail.

The frame 20 includes vertical tube members 42 at each side thereof with parallel cross plates 44 extending therebetween near the top thereof, and a cross channel brace 46 extending between the tubes beneath the plates to form a rigid frame structure. The boom members 28 are secured to the frame cross plates 44. Rods 48 extend within the tubes and have wheel brackets 50 mounted at the lower ends thereof for mounting the wheels 22. The rods 48 may be mounted for rotational movement within the tubes to allow steering of the wheels. Connected to the rods just beneath the brace 46 are arms 52 connected by a tie rod 54. A hydraulic cylinder 56 is connected be- tween a bracket 58 mounted to the brace 46 and one of the arms 52 such that extension and retraction of the cylinder piston rotates both rods 48 through the tie rod 54 and arms 52, to steer the wheels. The wheels are driven by motor and gear drives 60. The coupler may be driven by driving one wheel, both wheels, or in some other manner to move it from one riser to another.

The frame 20 also includes vertical tubes 64 extending between and secured to the plates 44 near their upper end, and further secured to frame members 66 extending from the brace 46 by suitable brackets 68. Thus, the tubes 64 are a rigid part of the frame.

Within the tubes 64 extend vertical rods 70. A cross member 72 is pivotally mounted at its ends to the top ends of the rods 70. At the lower ends of the rods are generally C-shaped jaws 74. The jaws are pivotally mounted at 76 to the lower ends of the rods and are operated between open and closed positions upon vertical movement of the rods 70 within the tubes 64 through operation of linkages 78 pivotally connected at their one ends to the jaws 74 and at their other ends to the lower ends of the tubes 64. It can be seen that upward movement of the rods 70 will close the jaws to the position shown in solid lines in FIG. 7, and downward movement will open them as shown in FIG. 2 and by the dashed lines in FIG. 7. The jaws have surfaces 80 which engage the underside of a flange 82 of the riser with the jaws closed to prevent vertical movement of the frame upon connection and disconnection of the coupler to the riser.

The conduit member 24 moves vertically relative the frame between retracted and extended positions. The conduit member has an upper elbow section 84 to one end of which is connected the boom member 26 and at the lower end of which is a slightly enlarged tubular portion 86, which is located between the vertical tubes 64. Near the bottom of the enlarged portion is a flange 90 to which a tubular extension 92 is connected by a mating flange 94. Between the flanges is secured the outer edge of an annular diaphragm seal 96 (FIGS. 7 and 10). The inner edge of the diaphragm is secured to the sealing member 34 as will be further explained.

Brackets 100 (FIGS. 2, 7, and 8) extend from opposite sides of the enlarged portion and have rollers 102 which ride on the outer surfaces of the tubes 64 for guiding the conduit member at its lower end during extension and retraction thereof. Another bracket 104 is secured to the conduit member at its elbow section 84 to which is mounted rollers 106 (FIGS. 2, 6 and 7), which ride along the inside surfaces of the tubes to guide the conduit member. Thus, the tubes 64 act as guide rails along which the conduit member travels between extended and retracted positions.

The cylinder 30 is mounted at its upper end to the cross member 72 and at its lower end to the top of the elbow section 84 by means of a suitable bracket 110, whereby extension and retraction of the cylinder 30 extends and retracts the conduit member.

The valve operator 38 is located within the lower portion of the conduit member and includes a vertical axial rod 112 secured to the enlarged portion of the conduit member by radial plates or spacers 114. Thus, the rod 112 is mounted for vertical movement with a conduit member. As will be explained, the axial rod 112 engages a similar axial rod which is part of the valve assembly 40 for operating the valve upon extension and retraction of the conduit member.

The sealing member 34 extends or telescopes within the lower end of the conduit member for axial movement relative thereto between an extended position as shown by the left-hand portion of FIG. 7 and a retracted position as shown by the right-hand portion. The sealing member 34 has a tubular section 120 with an outer annular flange 122 that slides relative the inner surface of the tubular extension 92 of the conduit member. The sealing member also has an inner annular flange 124 with a tapered surface 126. Beneath the tapered surface is a recess 128 for receiving a ring type seal 130. The inner edge of the diaphragm 96 is secured at the top of the sealing member by a ring 132 so that the inner edge of the diaphragm moves with the sealing member and the outer edge of the diaphragm moves with the conduit member. The outer edge of the ring 132 slides relative the inner surface of the conduit member so that the ring 132 and flange 122 tend to hold the sealing member in axial alignment as it moves relative the conduit member. The outer diameter of the upper portion of the sealing member is sufficiently smaller than the inner diameter of the conduit member so as to allow a sufficient cavity or space for the coiling and uncoiling of the diaphragm upon relative movement of the two members.

The sealing member has a lower outer flange 134 and a flared bottom end 136 for ease in guiding the coupler onto the riser. Extending between the flange 94 of the conduit member and the flange 134 of the sealing member are pin and spring assemblies 140 for spring biasing the sealing member in its extended or lowered position relative the conduit member.

The riser 12 is generally a T-section with a tubular section 144 extending upwardly from the pipe line 14, the tubular section 144 having a flange 146 at the upper end thereof. Another pipe section 148 with lower and upper flanges 150 and 82 extends upwardly from the section 144, and another tubular section 154 with a lower flange 156 extends upwardly from the section 148. Suitable gaskets or seals 158 and 160 are between the flanges. The upper pipe section 154 has an annular taper 162 at its upper end which mates with the taper 126 of the sealing member 34. The upper pipe member 154 is sized to slide easily within the lower end of the sealing member 34 for engagement of the mating tapered surfaces 126 and 162 and sealing engagement of the annular seal 130 with the upper end of the riser.

The valve assembly 40 has an annular valve plate 166 secured to an axial rod 170, the valve plate 166 having an outer annular surface 172 for sealing engagement with the gasket 160 when the valve is closed. The valve plate 166 is held centered within the tubular section 148 by radial spacers 174. From the valve plate the rod 170 extends downwardly through an opening 176 in a support bracket 178, the ends of which are secured to the lower end of the tube section 148. A spring 180 surrounds the axial rod 170 between the valve plate 166 and bracket 178 to bias the valve closed.

Depending from the frame is an arm 184 (FIG. 2) with an actuator 186 at the lower end thereof for actuating a switch upon engagement with a stake 190. The stake 190 is located adjacent the riser. The switch is part of an electrical control circuit whereby actuation of the switch stops the coupler at the riser and initiates connection of the coupler therewith in a manner similar to that of the switch 158 and control circuit of said co-pending patent application Ser. No. 161,678.

Mounted at the top of the conduit member for vertical movement therewith is a vertical arm 191 (FIG. 4) having actuating members 192 and 194. Switches 196 and 198 are mounted in fixed relation relative the frame, such as to the boom member 28, the switch 196 being actuated by the actuator 192 upon contact therewith and the switch 198 being actuated by the actuator 194 upon contact therewith. The switch 196 is actuated to detect the fully extended position of the coupler and the switch 198 is actuated to detect its fully retracted position. The purposes for the switches 196 and 198 are to initiate operation of the couplers and the boom drives in a liquid delivery apparatus such as the type shown and described in said co-pending application to alternately connect and disconnect the couplers progressively to the risers as the irrigation system moves over the field. Thus, the switches 196 and 198 are part of an electrical control circuit and operate in essentially the same way to perform essentially the same function as the switches 209 and 210 and control circuit of said co-pending application.

In addition to the switches 196 and 198, the present invention also includes a switch 200 which is actuated by an arm 202 extending from one of the vertical rods 70. The purpose of the switch 200 is to control the speed of extension and retraction of the cylinder 30 such that it operates at one speed to engage and disengage the sealing member with the riser, and at a substantially reduced speed to operate the valve so that water hammer from valving the high pressure liquid in the pipe line is avoided. The switch 200 controls the operation of a solenoid operated control valve in a hydraulic circuit to control the speed of the cylinder 30.

Such a hydraulic circuit 206 is shown schematically in FIG. 11. The circuit 206 has lines 208 and 210 from a suitable hydraulic reversing circuit for reversing the flow of fluid in the circuit 206 for extension and retraction of the cylinder 30. For extension of the cylinder 30, the fluid path is clockwise with the line 208 the input and the line 210 the return. With the control valve in the position shown, fluid at one flow is directed through the control valve directly to the cylinder 30 through a line 212 to extend the cylinder. When the cylinder has extended to actuate the switch 200, the solenoid operated control valve is operated to direct the fluid through a line 214 and the valves V-1 and V-2 to further extend the cylinder 30. The valve V-2 reduces the flow to the cylinder to substantially reduce the speed with which the cylinder further extends. Upon retraction of the cylinder, the cylinder begins to retract at the reduced speed (the valve V-1 reducing the flow of fluid) until the valve 40 in the riser is closed, whereupon the switch 200 operates the control valve to the position shown to increase the flow of fluid to the cylinder and further retract the cylinder at the increased speed.

The coupler may include a suitable guidance control 220 for guiding the coupler along a path as may be defined by a guide wire 222 extending along the length of the field to be irrigated. The guidance system may be similar to that shown and described in said co-pending application and U.S. Pat. No. 4,172,551, the entirety of which is incorporated herein by reference.

Operation

Assuming the coupler is in the fully retracted position as shown in FIGS. 2 and 4, and that it is being driven along the pipe line 14, proper positioning of the coupler relative to a riser for connection therewith is detected by actuation of a switch through engagement of the actuator 186 with the stake 190 to disengage the coupler drive and initiate extension of the coupler for connection with the riser. Extension of the cylinder 30 causes extension of the conduit and sealing members 24 and 34 together until the sealing member is in sealing engagement with the riser in the position shown by the left portion of FIG. 7. In this position, the tapered surfaces 126 and 162 are seated with the seal 130 effecting a liquid tight seal with the top of the riser.

With the sealing member 34 engaged with the riser as shown on the left of FIG. 7, further extension of the cylinder 30 will cause upward movement of the vertical rods 70 within the tubes 64. This will cause the jaws 74 to pivot to the position shown by the solid lines in FIG. 7 and clamp beneath the flange 82 of the riser. This locks the frame of the coupler to the riser to prevent the frame from moving upwardly upon further extension of the cylinder. Instead, further extension of the cylinder produces further downward movement of the conduit member.

With the coupler in the position shown by the left portion of FIG. 7, the switch 200 is actuated to reduce the speed at which the cylinder 30 further extends. Thus, at this reduced speed, the cylinder 30 continues to operate to further extend or lower the conduit member. With the sealing member engaging the riser, the conduit member moves downwardly relative the sealing member against the force of the springs 140 causing the sealing member to retract relative the conduit member. In other words, the conduit member slides downwardly relative the sealing member in a telescoping manner. As it does so, the diaphragm seal 96 uncoils as generally shown by the right portion of FIG. 7. Also, as the conduit member moves downwardly relative the sealing member, the rod 112 depresses the rod 170 against the force of the spring 180 to open the valve 40. This allows the liquid under pressure in the pipe line 14 to flow through the valve and the coupler to the irrigation system. The conduit member continues its downward movement relative the sealing member to the position shown on the right of FIG. 7.

In disconnecting the coupler from the riser, the operation is reversed. The cylinder 30 is retracted at the reduced speed to move the conduit member upwardly, allowing the valve 40 to close under the force of the spring 180. With the valve 40 closed, further retraction of the cylinder lowers the rods 70 relative the tubes 64, whereupon the switch 200 is actuated to increase the speed at which the cylinder 30 further retracts to open the jaws 74 to the position shown by the dashed lines on the right of FIG. 7. The cylinder 30 then continues to retract at the increased speed to lift the conduit and sealing members and disengage the sealing member from the riser. The coupler is retracted to the position shown in FIG. 2 to clear the riser for movement of the coupler along the field to the next riser.

It will be noted that the coupler of the present invention requires only one cylinder to actuate the entire sequence, and there are no sliding seals to be damaged by sand, dirt, and other abrasive substances found in the environment in which a coupler of this type is used. The seal 130 seals at the top of the riser, and the seal 96 coils and uncoils rather than slides to affect a seal between the conduit and sealing members. Thus, the coupler of this invention is exceptionally reliable with long life in view of the severe environmental conditions in which it is used.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

We claim:

1. In an irrigation system having a liquid delivery apparatus for delivering liquid under pressure from a pressurized pipe line extending along the field to be irrigated to the irrigation system for dispensing the liquid onto the field, the pipe line having a series of connectors spaced along its length with valve means associated therewith, a coupler for connection with said connectors and for operating said valve means to deliver liquid from the pipe line to the irrigation system, said coupler comprising: a frame, a first member movable relative said frame for connection and disconnection of said coupler with a connector, valve operating means for operating said valve means between open and closed positions upon connection and disconnection of said coupler with said connector, a second member for engagement with said connector upon connection therewith, said first member extending relative said second member upon operation of said valve means between open and closed positions.

2. The coupler of claim 1 further comprising means maintaining a liquid seal between said first and second members during relative movement thereof.

3. The coupler of claim 2 wherein said seal maintaining means further comprises a diaphragm seal between said members.

4. The coupler of claim 1 further comprising means for biasing said second member to an extended position relative said first member for engagement of said second member with said connector with said valve means closed.

5. The coupler of claim 1 further comprising means for moving said first member at a first speed for engagement and disengagement of the coupler with said connector, and means for moving said first member at a second speed, substantially slower than the first, to operate said valve means.

6. The coupler of claim 1 further comprising means engaging said connector for preventing movement of said frame relative said connector upon movement of said first member in operating said valve means.

7. The coupler of claim 1 wherein said second member includes means effecting a liquid seal between said second member and said connector upon engagement therewith.

8. The coupler of claim 7 wherein said connector is a riser having a portion extending upwardly from said pipe line, said second member effecting a seal at the top of said riser upon engagement therewith.

9. In an irrigation system having a liquid delivery apparatus for delivering liquid under pressure from a pressurized pipe line extending along a field to be irrigated to the irrigation system for dispensing the liquid onto the field, the pipe line having a series of connectors spaced along its length with valve means associated therewith, a coupler for connection with said connectors and for operating said valve means to deliver liquid from the pipe line to the irrigation system, said coupler comprising: a frame, a conduit member movable generally vertically relative said frame between a retracted disconnect position and an extended connect position with said connector, said conduit member having valve operating means associated therewith for operating said valve means between open and closed positions upon connection and disconnection of said coupler with said connector, a sealing member for sealing engagement with said connector upon connection therewith, means for mounting said sealing member to said conduit member for relative generally vertical movement of said conduit member with respect to said sealing member during operation of said valve means, and means maintaining a liquid seal between said conduit and sealing members during relative movement thereof, whereby partial extension of said conduit member from a fully retracted position engages said sealing member with said connector and further extension of said conduit member causes movement of said conduit member relative said sealing member and operation of said valve means to an open position, and whereby partial retraction of said conduit member from a fully extended position causes movement of said conduit member relative said sealing member and operation of said valve means to a closed position while maintaining sealing engagement between said sealing member and said connector, and further retraction of said conduit member disengages said sealing member from said connector.

10. The coupler of claim 9 wherein said seal maintaining means further comprises a diaphragm seal between said members.

11. The coupler of claim 10 wherein said sealing member is biased to an extended position relative said conduit member, and wherein said sealing member is retracted relative said conduit member for operating said valve means.

12. The coupler of claim 10 wherein said connector is a riser having a portion extending upwardly from the pipe line for connection therewith, said sealing means having means effecting a liquid seal at the top of said riser upon engagement therewith.

13. The coupler of claim 9 further comprising means for moving said conduit member at a first speed for engagement and disengagement of said sealing member with said connector, and means for moving said conduit member at a second speed, substantially slower than the first, to operate said valve means.

14. The coupler of claim 9 further comprising means engaging said connector for preventing movement of said frame relative said connector during operation of said valve means.

15. The coupler of claim 14 further comprising jaws operable between an open position out of engagement with said connector and a closed position into engagement with said connector to prevent relative movement of the frame and connector, and means to operate said jaws between said open and closed positions upon connection and disconnection of said coupler with said connector.

16. The coupler of claim 15 further comprising vertical rods mounted for vertical movement relative said frame, means for moving said rods relative said frame upon movement of said conduit member between retracted and extended positions, said jaws being pivotally mounted at the lower end of said rods, vertical movement of said rods causing pivotal movement of said jaws between said open and closed positions.

17. The coupler of claim 10 wherein said conduit and sealing members are mounted in telescoping relationship, said members defining a space therebetween for housing said diaphragm seal, said space being sufficiently great to allow coiling and uncoiling of said diaphragm seal upon relative movement of said members.

18. The coupler of claim 9 wherein said frame is supported on the ground by wheels, and further comprising means for moving the coupler along the pipe line from one connector to the next for progressively connecting and disconnecting said coupler to the connectors for delivering liquid from the pipe line to the irrigation system.

19. In an irrigation system having a liquid delivery apparatus for delivering liquid under pressure from a pressurized pipe line extending along the field to be irrigated to the irrigation system for dispensing the liquid onto the field, the pipe line having a series of connectors spaced along its length with valve means associated therewith, a coupler for connection with said connectors and for operating said valve means to deliver liquid from the pipe line to the irrigation system, said coupler comprising a frame, at least two conduit members mounted to the frame for relative movement thereto and with respect to each other, means to move said conduit members with respect to the frame and with respect to each other, at least one of said conduit members having a seal means mounted thereon to seal it to the connector, and a second seal means sealing said conduit members to each other.

20. The coupler of claim 19 wherein said conduit member moving means comprises a single hydraulic cylinder.

21. The coupler of claim 19 further comprising means biasing said conduit members into a relative extended position, and wherein said conduit member moving means retracts said conduit members upon connection thereof to a connector.

22. The coupler of claim 21 wherein said second sealing means comprises a diaphragm.

23. The coupler of claim 19 further comprising means engaging said connector for preventing movement of said frame relative said connector upon connection thereto.

24. The coupler of claim 19 wherein said second sealing means comprises a diaphragm.

25. The coupler of claim 19 wherein said conduit members are concentrically mounted in a telescoping relationship, the inside conduit member sealing to the connector, and the outside conduit member having a valve actuator associated therewith so that movement of the outside conduit member with respect to the connector actuates the valve.

26. The coupler of claim 25 further comprising means biasing said conduit members into a relative extended position, and wherein said conduit member moving means retracts said conduit members to open the valve.

27. In an irrigation system having a liquid delivery apparatus for delivering liquid under pressure from a pressurized pipe line extending along the field to be irrigated to the irrigation system for dispensing the liquid onto the field, the pipe line having a series of connectors spaced along its length with valve means asssocciated therewith, a coupler for connection with said connectors and for operating said valve means to deliver liquid from the pipe line to the irrigation system, said coupler comprising a frame, at least two conduit members mounted to the frame, means to move said conduit members with respect to each other, means to seal one of said conduit members to the connector, a second sealing means between said conduit members, said second sealing means comprising a diaphragm, said diaphragm being of sufficient size to permit coiling or uncoiling thereof as said conduit members move with respect to each other.

28. The coupler of claim 27 wherein the diaphragm coils as the conduit members retract, and uncoils as the conduit members extend.

29. The coupler of claim 27 wherein the conduit members are retracted as the valve is actuated.

30. In an irrigation system having a liquid delivery apparatus for delivering liquid under pressure from a pressurized pipe line extending along the field to be irrigated to the irrigation system for dispensing the liquid onto the field, the pipe line having a series of connectors spaced along its length with valve means associated therewith, a coupler for connection with said connectors and for operating said valve means to deliver liquid from the pipe line to the irrigation system, a method for connecting said coupler to said connector comprising the steps of:

positioning the coupler in line with the connector, sealing a second member of the coupler to the connector, retracting a first member of the coupler with respect to the second member, said first member having a valve actuator associated therewith, and opening the valve in the connector to thereby connect a passageway for water in the connector to flow into the coupler.

31. The method of claim 30 wherein the coupler further comprises a frame for supporting the conduit members and further comprising the step of:

securing the coupler to the connector to prevent movement of the frame relative the connector as the first member is retracted with respect to the second member.

32. The method of claim 31 wherein the step of sealing the second member to the connector includes the step of:

extending both coupler members relative the frame.

33. The method of claim 32 further comprising the step of:

slowing the movement of the coupler members during the retraction step.

34. The method of claim 30 further comprising the method of disconnecting the once connected coupler through the steps of:

extending the first coupler member with respect to the second to thereby close the valve in the connector, and unsealing the second member from the connector by retracting it therefrom.

* * * * *